(12) United States Patent
Zhou et al.

(10) Patent No.: US 11,640,327 B2
(45) Date of Patent: May 2, 2023

(54) CIRCUIT DETECTION METHOD AND DATA DETECTION CIRCUIT

(71) Applicant: HORIZON (SHANGHAI) ARTIFICIAL INTELLIGENCE TECHNOLOGY CO., LTD., Shanghai (CN)

(72) Inventors: Yi Zhou, Shanghai (CN); Honghe Tan, Shanghai (CN); Xiaoqiao Chen, Shanghai (CN); Chen Sun, Shanghai (CN); Wenxing Li, Shanghai (CN); Jing Li, Shanghai (CN); Luyang Zhang, Shanghai (CN)

(73) Assignee: HORIZON (SHANGHAI) ARTIFICIAL INTELLIGENCE TECHNOLOGY CO., LTD., Shanghai (CN)

( * ) Notice: Subject to any disclaimer, the term of this patent is extended or adjusted under 35 U.S.C. 154(b) by 22 days.

(21) Appl. No.: 17/329,852

(22) Filed: May 25, 2021

(65) Prior Publication Data
US 2021/0373988 A1  Dec. 2, 2021

(30) Foreign Application Priority Data
May 26, 2020  (CN) .......................... 202010455249.7

(51) Int. Cl.
*G06F 11/07*  (2006.01)

(52) U.S. Cl.
CPC ........ *G06F 11/079* (2013.01); *G06F 11/0751* (2013.01)

(58) Field of Classification Search
CPC ............... G06F 11/1004; G06F 11/079; G06F 11/0751; G06F 11/076
See application file for complete search history.

(56) References Cited

FOREIGN PATENT DOCUMENTS

KR  20170020071 A  *  8/2015  ......... G01R 22/0063

* cited by examiner

*Primary Examiner* — Nadeem Iqbal
(74) *Attorney, Agent, or Firm* — Brooks Kushman P.C.

(57) ABSTRACT

Embodiments of the present disclosure disclose a circuit detection method and a data detection circuit. The circuit detection method comprises: if a current time point reaches a preset detection time period, based on a data storage address of a detected module, reading a data to be detected corresponding to the detected module from a storage area corresponding to the data storage address; using a preset calculation method corresponding to the detected module to perform a calculation on the data to be detected to obtain a first calculation result; based on the first calculation result and a preset calculation result corresponding to the data storage address, determining a fault state of the detected module. The embodiments of the present disclosure can detect the storage circuit in a timely and accurate manner without data verification by adding hardware, thereby saving space occupied by the system and reducing power consumption.

17 Claims, 5 Drawing Sheets

CIRCUIT DETECTION METHOD AND DATA DETECTION CIRCUIT

CROSS-REFERENCE TO RELATED APPLICATIONS

The present disclosure claims benefit and priority to Chinese Patent Application No. 202010455249.7, titled "CIRCUIT DETECTION METHOD AND DATA DETECTION CIRCUIT," and filed on May 26, 2020, the disclosure of which is hereby expressly incorporated by reference herein in its entirety.

TECHNICAL FIELD OF THE DISCLOSURE

The present disclosure relates to the technical field of electronic circuits, in particular to a circuit detection method and a data detection circuit.

BACKGROUND

In the current system-on-chip design, a clock system is very complicated, which affects the integrity of data in memories and registers of the system. According to the requirements of functional safety, it is necessary to ensure the integrity of system storage contents and the integrity of system register configuration. Memories and registers can usually be verified using methods such as ECC and Parity.

SUMMARY

Embodiments of the present disclosure provide a circuit detection method, a data detection circuit, and an electronic device.

According to an aspect of the embodiments of the present disclosure, a circuit detection method is provided. The circuit detection method comprises: if a current time point (or referred to as "a current point-in-time") reaches a preset detection time period, reading a data to be detected corresponding to a detected module from a storage area corresponding to a data storage address of the detected module based on the data storage address; using a preset calculation method corresponding to the detected module to perform a calculation on the data to be detected to obtain a first calculation result; determining a fault state of the detected module based on the first calculation result and a preset calculation result corresponding to the data storage address.

According to another aspect of the embodiments of the present disclosure, a data detection circuit is provided. The data detection circuit comprises a data detection module and a detected module, wherein the data detection module is used for: reading a data to be detected from the detected module based on a data storage address of the detected module if a current time point reaches a preset detection time period; using a preset calculation method corresponding to the detected module to perform a calculation on the data to be detected to obtain a first calculation result; determining a fault state of the detected module based on the first calculation result and a preset calculation result corresponding to the data storage address.

According to another aspect of the embodiments of the present disclosure, an electronic device is provided. The electronic device comprises: a data detection module, a detected module, and a memory for storing instructions executable by a processor, the data detection module being used for reading the executable instructions from the memory and executing the instructions to implement the above circuit detection method.

Based on the circuit detection method, the data detection circuit, and the electronic device provided by the above mentioned embodiments of the present disclosure, the data to be detected is periodically read from the storage area corresponding to the data storage address of the detected module, then the preset calculation method corresponding to the detected module is used to perform a calculation on the data to be tested to obtain the first calculation result, and finally, the first calculation result is compared with the preset calculation result corresponding to the data storage address to determine the fault state of the detected module. The fault state of the data to be detected is determined by comparing the first calculation result by the first calculation method, so there is no need to increase the hardware for data verification, which saves the space occupied by the system-on-chip and greatly reduces the power consumption of the system-on-chip. In addition, due to that the data to be detected in the storage area corresponding to the data storage address of the detected module is read regularly, and the data to be detected can accurately represent the real information of the detected module. Therefore, the present disclosure can detect the detected module in a timely and accurate manner, further can meet the requirements of functional safety and ensure the integrity of the stored data related to the detected module.

The technical solutions of the present disclosure will be further described in detail below through accompanying drawings and embodiments.

BRIEF DESCRIPTION OF THE DRAWINGS

Through a more detailed description of embodiments of the present disclosure in conjunction with the accompanying drawings, the above and other objectives, features, and advantages of the present disclosure will become more apparent. The accompanying drawings are used to provide a further understanding of the embodiments of the present disclosure, and constitute a part of the specification. Together with the embodiments of the present disclosure, they are used to explain the present disclosure, but do not constitute a limitation to the present disclosure. In the drawings, the same reference numerals generally represent the same components or steps.

DETAILED DESCRIPTION

Figure 1:
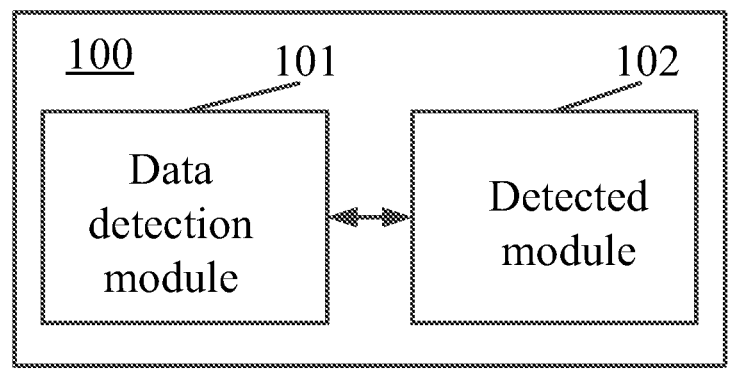
FIG. 1 is an exemplary structure diagram of a data detection circuit provided by an exemplary embodiment of the present disclosure.

Hereinafter, exemplary embodiments of the present disclosure will be described in detail with reference to the accompanying drawings. Obviously, the described embodiments are only a part of embodiments of the present disclosure, rather than all of them, and it should be understood that the present disclosure is not limited by the exemplary embodiments described herein.

It should be noted that unless specifically stated otherwise, the relative arrangement of components and steps, numerical expressions and numerical values set forth in these embodiments do not limit the scope of the present disclosure.

Those skilled in the art can understand that terms such as "first" and "second" in the embodiments of the present disclosure are only used to distinguish different steps, devices or modules, etc., and do not represent any specific technical meanings, nor do they mean that there are necessary logical orders between them.

It should also be understood that in the embodiments of the present disclosure, "plurality" may refer to two or more than two, and "at least one" may refer to one, two, or more than two.

It should also be understood that any component, data, or structure mentioned in the embodiments of the present disclosure can generally be understood as one or more, unless it is clearly defined or given opposite enlightenment in the context.

In addition, the term "and/or" in the present disclosure is merely an association relationship describing associated objects, which means that there can be three types of relationships, for example, A and/or B can mean three cases as follows: only A alone, both A and B, and only B. In addition, the character "/" in the present disclosure generally indicates that the associated objects before and after are in an "or" relationship.

It should also be understood that the description of the various embodiments in the present disclosure emphasizes on the differences between the various embodiments, and the same or similar points can be referred to each other, and for simplicity, they will not be repeated one by one.

At the same time, it should be understood that, for ease of description, the sizes of the various parts shown in the drawings are not drawn in accordance with actual proportional relationships.

The following description of at least one exemplary embodiment is actually only illustrative, and in no way serves as any limitation to the present disclosure and its application or use.

The technologies, methods, and equipment already well known to those of ordinary skill in the arts may not be discussed in detail, but where appropriate, the technologies, methods, and equipment should be regarded as part of the specification.

It should be noted that similar reference numerals and letters indicate similar items in the following drawings, and therefore, once an item is defined in one drawing, it does not need to be further discussed in the subsequent drawings.

Overview

Existing data verification methods usually use a hardware mode to perform detections of error correction code (ECC), Parity, etc., however the detection in a hardware mode will increase the space occupied by the system-on-chip, and each data access needs to be verified, which will increase additional power consumption.

Exemplary Data Detection Circuit

FIG. 1 shows an exemplary structure diagram of a data detection circuit 100 to which an embodiment of the present disclosure can be applied.

As shown in FIG. 1, the data detection circuit 100 may include a data detection module 101 and a detected module 102. The detected module 102 is a hardware device for storing data. Optionally, the detected module 102 may include but is not limited to at least one of a register, an internal memory, and an external memory. As an example, the register may include an instruction register, a pointer register, and so on. The internal memory may include SRAM, ROM, and so on. The external memory can include DDR, SD, eMMC, and so on.

The data detection module 101 can read a data from the detected module 102 and detect the read data. The data detection module 101 can comprise hardware devices such as timers, comparators, and arithmetic units.

In this embodiment, the data detection module 101 may perform the following steps:

First, if a current time point reaches a preset detection time period, a data to be detected is read from the detected module 102 based on a data storage address of the detected module 102.

Specifically, it may be determined whether the current time point reaches a detection time period based on a timing device comprised in the data detection circuit or a timing device connected to the data detection circuit. The timing device may be a timer, a counter, a clock, and so on. As an example, the preset detection time period may be 1 minute, 1 hour, 1 day, etc., that is, the data is detected once in each detection time period. The data storage address of the detected module 102 may be preset, for example, an address list is preset, and the detected module 102 may read the data to be detected from a corresponding storage area in the detected module 102 according to the data storage address comprised in the address list.

Then, a preset calculation method corresponding to the detected module 102 is used to perform a calculation on the data to be detected to obtain a first calculation result.

The number of the detected modules 102 may be one or more, and each detected module 102 corresponds to a preset calculation method. Generally, the preset calculation method can be embodied by the corresponding algorithm code, that is, the data detection circuit can comprise a code storage unit, and the data detection module 101 executes the code stored in the code storage unit to complete the calculation. The preset calculation method may comprise, but is not limited to, at least one of the following algorithms: CRC8, CRC12, CRC16, CRC32, CRC-CCITT, MD4, MD5, SHA-1, SHA-256, etc.

Finally, based on the first calculation result and a preset calculation result corresponding to the data storage address, a fault state of the detected module 102 is determined.

Each data storage address can correspond to a preset calculation result which is the result obtained by calculating the data to be detected corresponding to the data storage address by using the corresponding preset calculation method in advance, that is, the preset calculation result is an accurate result. Generally, the data detection module 101 can compare whether the first calculation result is the same as the preset calculation result. If they are the same, it means that the data stored in the corresponding storage space is correct, that is, the detected module 102 has no fault. At this time, it can output information, such as, a number "1", to indicate that there is no fault. Otherwise, it indicates that the detected module 102 has a fault, and at this time, information indicating that a fault has occurred, such as, a number "0", can be output.

In the data detection circuit provided by the above mentioned embodiments of the present disclosure, by providing the data detection module and the detected module in the data detection circuit, the data detection module periodically reads the data to be detected from the storage area corresponding to the data storage address of the detected module, then the preset calculation method corresponding to the detected module is used to perform calculations on the data to be detected to obtain the first calculation result, and finally the first calculation result is compared with the preset calculation result corresponding to the data storage address to determine the fault state of the detected module. As a result, there is no need to perform the data verification by adding hardware, which saves the space occupied by the system-on-chip and greatly reduces the power consumption of the system-on-chip. In addition, due to that the data to be detected in the storage area corresponding to the data storage address of the detected module is read regularly, and the data to be detected can accurately represent the real information of the detected module, the present disclosure can detect the detected module in a timely and accurate manner, thereby meeting the requirements of functional safety and ensuring the integrity of the stored data of the detected module.

Figure 2:
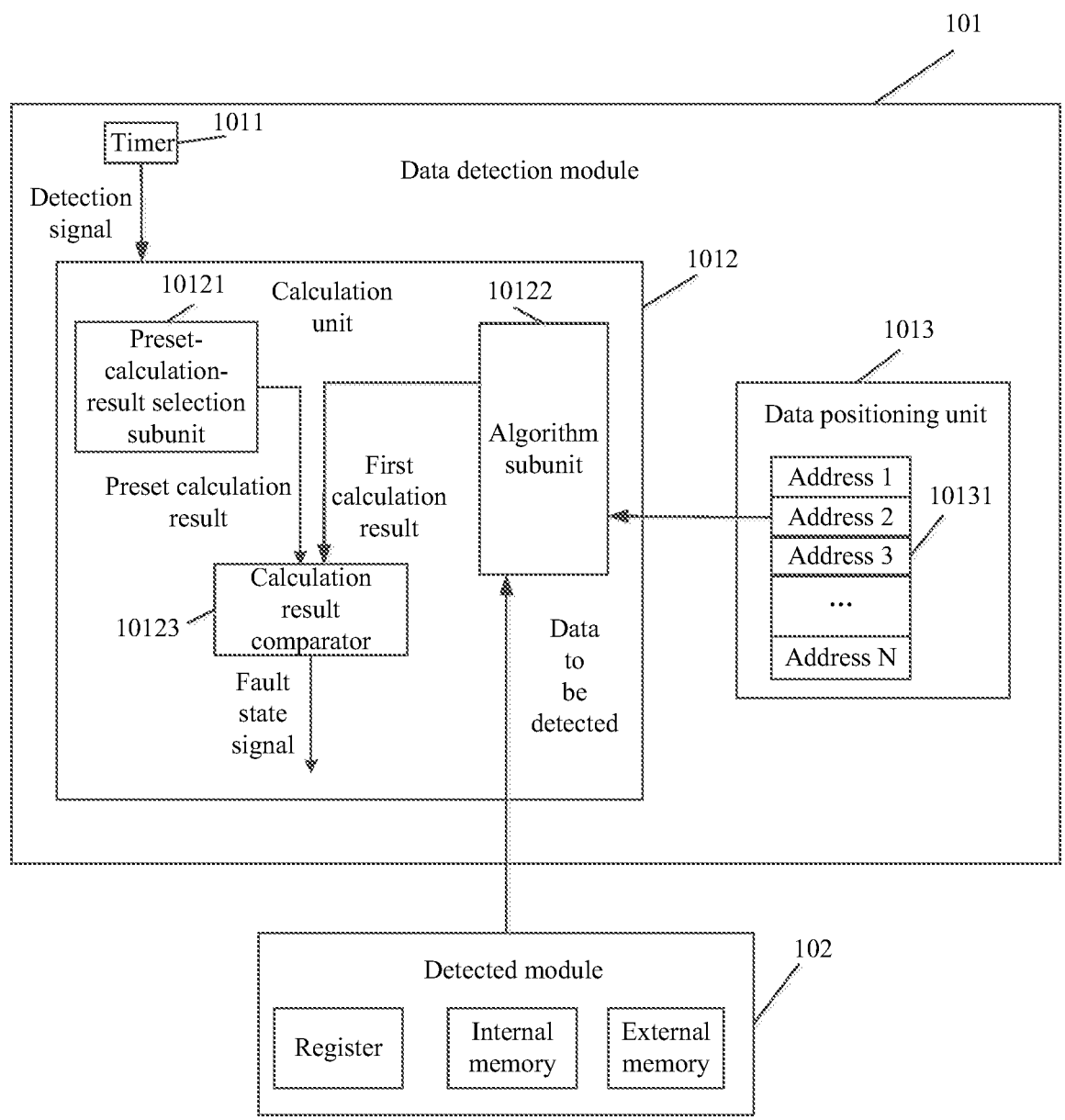
FIG. 2 is an exemplary structure diagram of a data detection circuit provided by another exemplary embodiment of the present disclosure.

In some optional implementations, as shown in FIG. 2, the data detection module 101 may comprise a timer 1011, a calculation unit 1012, and a data positioning unit 1013.

The timer 1011 is used for setting a detection time period of the data detection module 101 and timing. When the timing time (or referred as "timekeeping time") reaches the detection time period, it outputs a detection signal for instructing the calculation unit 1012 to perform data detection. The detection signal can be a signal of various forms, such as a digital signal, a level signal, and the like.

The data positioning unit 1013 is used for setting a data storage address of the data to be detected. The data storage address is used to represent, in the detected module 102, the location of storage space storing the aforementioned data to be detected. The number of the data storage addresses may be at least one. As an example, each data storage address may comprise a start address, an end address, and addresses that need to be excluded from the storage space.

The calculation unit 1012 is configured to read the data to be detected from the detected module 102 based on the data storage address when the above detection signal is detected, then use a preset calculation method corresponding to the detected module 102 to perform a calculation on the data to be detected to obtain a first calculation result, and finally, determine a fault state of the detected module 102 based on the first calculation result and a preset calculation result corresponding to the data storage address.

In this implementation, by setting a timer 1011, a calculation unit 1012, and a data positioning unit 1013 in the data detection module 101, different hardware devices can be used to perform different operations, thereby improving the efficiency of data detection.

In some optional implementations, as shown in FIG. 2, the calculation unit 1012 comprises a preset-calculation-result selection subunit 10121, an algorithm subunit 10122, and a calculation result comparator 10123.

The algorithm subunit 10122 is used to obtain the data storage address from the data positioning unit 1013 when the detection signal is detected, extract the data to be detected from the detected module 102 according to the data storage address, and use the preset calculation method corresponding to the detected module 102 to perform a calculation on the data to be detected to obtain the first calculation result.

Figure 3:
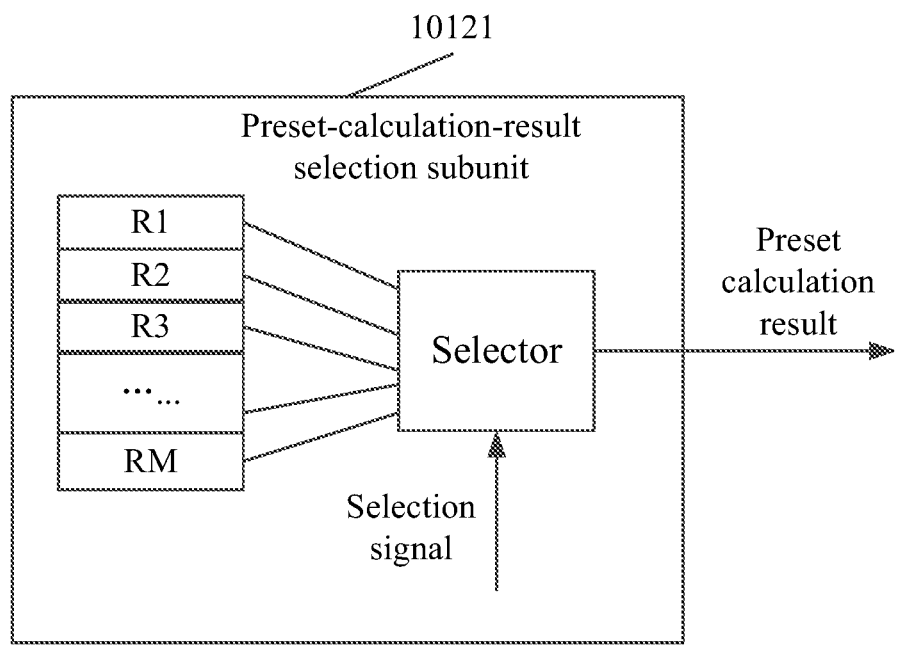
FIG. 3 is a schematic diagram of selecting a preset calculation result from a preset-calculation-result selection subunit of the data detection circuit of an embodiment of the present disclosure.

The preset-calculation-result selection subunit 10121 is used to select the preset calculation result corresponding to the data storage address. FIG. 3 shows a schematic diagram of selecting a preset calculation result from the preset-calculation-result selection subunit 10121 according to the data storage address. The preset-calculation-result selection subunit 10121 may comprise a preset calculation result register group (comprising RI-RM shown in the figures) and a selector. The selector selects a corresponding preset calculation result register from the preset calculation result register group according to the data storage address (for example, generate a selection signal as shown in the figure according to the data storage address), and extract the preset calculation result from the selected preset calculation result register.

The calculation result comparator 10123 is used for determining the fault state of the detected module 102 based on the first calculation result and the preset calculation result. As shown in FIG. 2, the first calculation result output by the algorithm subunit 10122 and the preset calculation result are input to the calculation result comparator 10123. The calculation result comparator 10123 compares whether the first calculation result and the preset calculation result are the same, and output a fault state signal indicating the fault state of the detected module 102.

In this implementation, by setting the preset-calculation-result selection subunit 10121, the algorithm subunit 10122, and the calculation result comparator 10123 in the calculation unit 1012, it is possible to use multiple hardware devices to cooperate with each other to output a signal indicating the fault state of the detected module 102, which contributes to improve the efficiency of data detection.

In some alternative implementations, as shown in FIG. 2, the data positioning unit 1013 comprises a data storage address list 10131, and the algorithm subunit 10122 is also used to read the data to be detected from the storage area in the detected module 102 corresponding to each storage address in the data address list according to the data storage address list 10131. The data storage address list 10131 may be pre-stored with multiple data storage addresses, and the algorithm subunit 10122 may sequentially read the data to be detected from the detected module 102 and perform calculations according to the list. By adopting the data storage address list in this implementation, the algorithm subunit 10122 can sequentially extract multiple data to be detected for detecting, thereby improving the efficiency of data detection.

Figure 4:
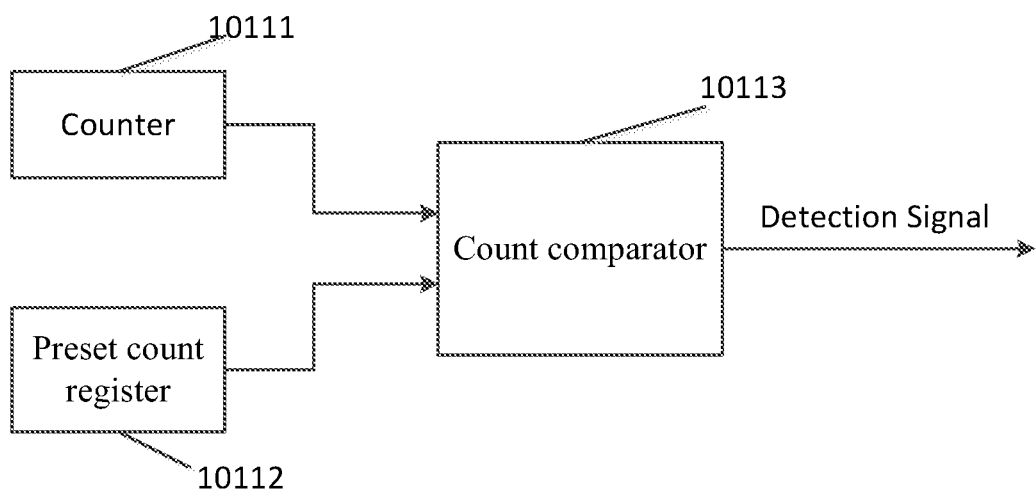
FIG. 4 is an exemplary structure diagram of a timer of the data detection circuit of an embodiment of the present disclosure.

In some alternative implementations, as shown in FIG. 4, the timer 1011 comprises a counter 10111, a preset count register 10112, and a count comparator 10113. The count comparator 10113 is used to compare whether a count value of the counter 10111 is the same as a preset value in the preset count register 10112, and if they are the same, it outputs a detection signal to the calculation unit. The counting mode of the counter 10111 can be sequential or reversed. The counter 10111 counts at a certain rate, and when it reaches a certain value, it is reset to the initial value. As an example, the counter 10111 may start counting sequentially from 0, and output a detection signal when the count value reaches the preset value, such as 10000.

This implementation uses the counter 10111, the preset count register, and the count comparator to implement timing, thereby improving the accuracy of timing and helping to improve the accuracy of data detection.

In some optional implementations, the algorithm subunit 10122 is also used to control the calculation unit 1012 to enter a dormant state when the detection of the data to be detected is completed. When the calculation unit 1012 enters the dormant state, the power consumption of the calculation unit 1012 can be reduced, thereby reducing the power consumption of the entire data detection circuit 100. Generally, if the current time reaches the detection time period, the calculation unit 1012 exits the dormant state, and the data detection circuit 100 starts to perform data detection. Based on this, the output detection signal in the optional implementation can be used as a wake-up signal to cause the calculation unit 1012 to exit the dormant state.

Exemplary Method

Figure 5:
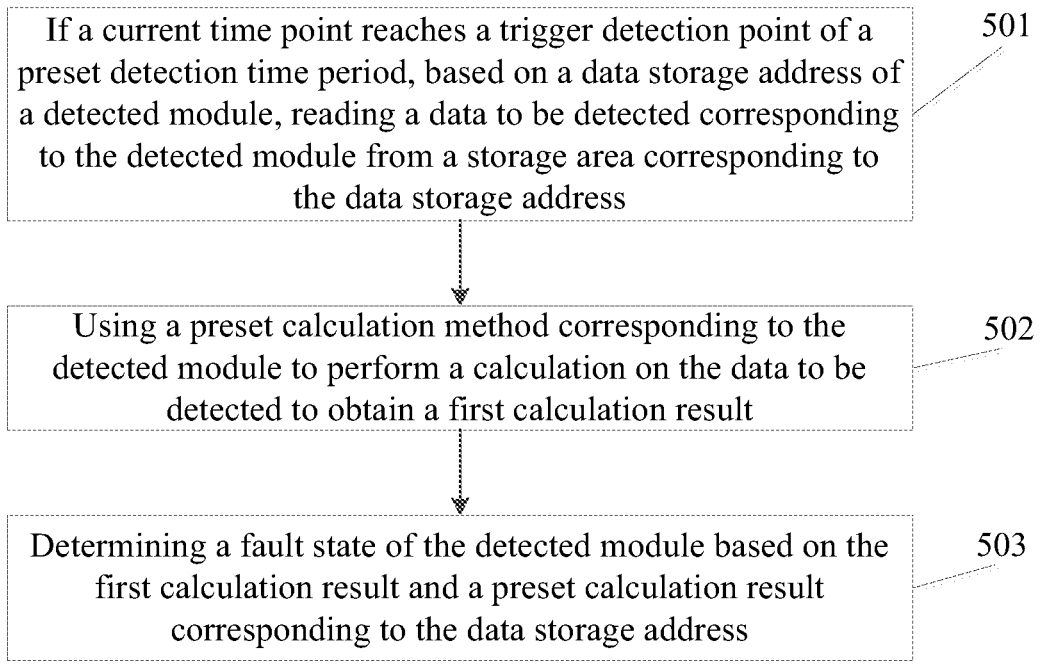
FIG. 5 is a schematic flowchart of a circuit detection method provided by an exemplary embodiment of the present disclosure.

FIG. 5 is a schematic flowchart of a circuit detection method provided by an exemplary embodiment of the present disclosure. This embodiment may be applied to the data detection circuit shown in FIG. 1. Specifically, the data detection module 101 shown in FIG. 1 may perform the following steps:

Step 501, if a current time point reaches a preset detection time period, based on a data storage address of a detected module, reading a data to be detected corresponding to the detected module from a storage area corresponding to the data storage address.

In this embodiment, the data detection module 101 may determine whether the current time point reaches the detection time period based on the timing device comprised in the data detection circuit 100 or the timing device connected to the data detection circuit 100. The timing device may be, for example, the timer 1011 shown in FIG. 2, a counter, a clock, and the like. As an example, the preset detection time period may be 1 minute, 1 hour, 1 day, etc., that is, the data is detected once in each detection time period. The data storage address of the detected module 102 as shown in FIG. 1 may be preset, for example, an address list is preset, and the detected module 102 may read the data to be detected from the corresponding storage area in the detected module 102 according to the data storage address comprised in the address list.

Step 502, using a preset calculation method corresponding to the detected module to perform a calculation on the data to be detected to obtain a first calculation result.

In this embodiment, the data detection module 101 may use a preset calculation method corresponding to the detected module 102 to perform a calculation on the data to be detected to obtain the first calculation result. The number of the detected modules 102 may be one or more, and each detected module 102 corresponds to one preset calculation method. Generally, the preset calculation method can be embodied by the corresponding algorithm code, that is, the above-mentioned data detection circuit 100 can comprise a code storage unit, and the data detection module 101 executes the code stored in the code storage unit to complete the calculation. The preset calculation method may comprise, but is not limited to, at least one of CRC8, CRC12, CRC16, CRC32, CRC-CCITT, MD4, MD5, SHA-1, SHA-256, and algorithms alike.

Step 503, determining a fault state of the detected module based on the first calculation result and a preset calculation result corresponding to the data storage address.

In this embodiment, the data detection module 101 may determine the fault state of the detected module 102 based on the first calculation result and the preset calculation result corresponding to the data storage address. Each data storage address can correspond to a preset calculation result which is a result obtained by calculating the data to be detected corresponding to the data storage address by using the corresponding preset calculation method in advance, that is, the preset calculation result is an accurate result. Generally, the data detection module 101 can compare whether the first calculation result is the same as the preset calculation result. If they are the same, it means that the data stored in the corresponding storage space is correct, that is, the detected module 102 has no fault. At this time, it can output information, such as a number "1", to indicate that there is no fault. Otherwise, it indicates that the detected module 102 has a fault, and at this time, information such as a number "0" to indicate there is a fault can be outputted.

In some optional implementation, the data detection module 101 may determine whether the current time point reaches the detection time period based on the following steps:

First, determining the magnitude relationship between the current count value for recording the detection time period and a preset value, the above-mentioned count value can be realized by means of software counting or hardware counting manner. As an example, the aforementioned data detection module may comprise a hardware counter which may periodically count at a certain rate.

Then, if the magnitude relationship indicates that the count value is the same as the preset value, determining that the current time point reaches the detection time period. As an example, when counting is performed by the above hardware counter, if the count value of the hardware counter reaches the preset value, the count value of the hardware counter can be restored to the initial value.

This implementation determines whether the detection time period is reached by counting periodically, which can improve the accuracy of timing.

In some optional implementations, the step 501 may comprise the following sub-steps:

First, the data storage address list corresponding to the detected module 102 is determined. The data storage address list may be preset in the above-mentioned data detection module 101, or may be set in other hardware communicatively connected with the above-mentioned data detection module 101. The data storage address list can be pre-stored with multiple data storage addresses.

Then, the data to be detected is sequentially read from the storage area corresponding to each storage address in the storage address list.

By utilizing a data storage address list, this implementation can sequentially extract multiple data to be detected to detect, thereby improving the efficiency of data detection.

In some optional implementation, the above-mentioned data detection module 101 may also enter a dormant state in response to the completion of the detection of the data to be detected, and restart timing of the detection time period. Usually, after completing the detection of the data to be detected this time, the data detection module 101 enters the dormant state, and at the same time restarts the timing of the detection time period, and when the next time reaches a new detection time period, the above steps 501 to 503 are executed again. This implementation can reduce the power consumption of the hardware by entering the dormant state after the detection of the data to be detected is completed.

The method provided by the foregoing embodiments of the present disclosure periodically reads the data to be detected from the storage area corresponding to the data storage address of the detected module, and then uses the preset calculation method corresponding to the detected module to perform calculations on the data to be detected, to obtain the first calculation result, and finally compare the first calculation result with the preset calculation result corresponding to the data storage address to determine the fault state of the detected module. Because the first calculation result obtained by the preset calculation method is used to determine the fault state of the data to be detected, there is no need to perform data verification by adding hardware, which saves the space occupied by the system-on-chip and can greatly reduce the power consumption of the system-on-chip. In addition, due to that the data to be detected in the storage area corresponding to the data storage address of the detected module is read regularly, and that the data to be detected can accurately represent the real information of the detected module, the present disclosure can detect the detected module in a timely and accurate manner, thereby meeting the requirements of functional safety and being able to ensure the integrity of the stored data of the detected module.

Figure 6:
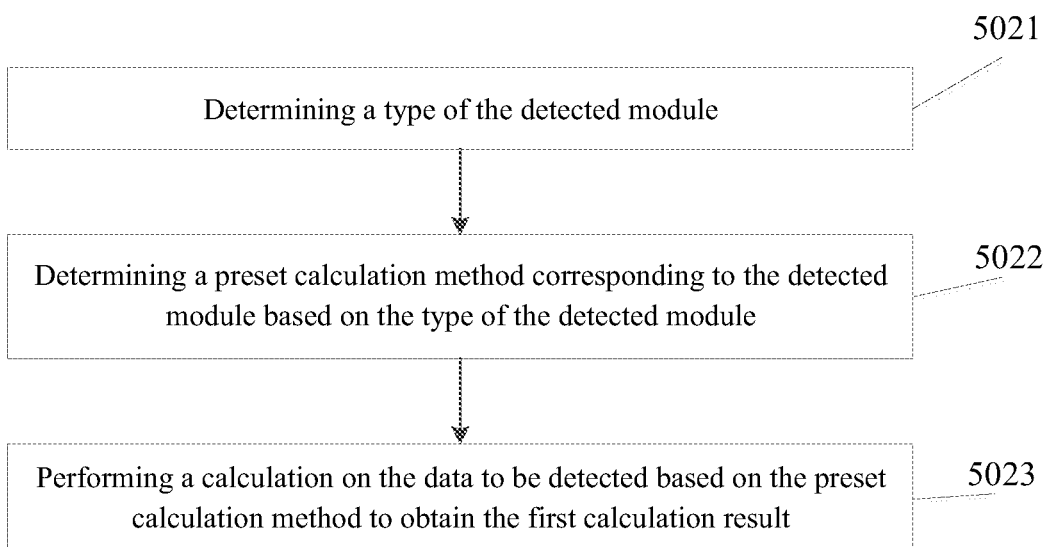
FIG. 6 is a schematic flowchart of a circuit detection method provided by another exemplary embodiment of the present disclosure.

With further reference to FIG. 6, a schematic flowchart of another embodiment of the circuit detection method is shown. As shown in FIG. 6, based on the embodiment shown in FIG. 5, step 502 may comprise the following steps:

Step 5021, determining a type of the detected module.

In this embodiment, the data detection module 101 can determine the type of the detected module 102. As an example, the type of the detected module 102 may comprise but is not limited to at least one of a register, an internal memory, and an external memory.

Step 5022, determining a preset calculation method corresponding to the detected module based on the type of the detected module.

In this embodiment, the data detection module 101 may determine the preset calculation method corresponding to the detected module 102 based on the type of the detected module 102. Each type corresponds to one preset calculation method.

Step 5023, performing a calculation on the data to be detected based on the preset calculation method to obtain the first calculation result.

In this embodiment, the data detection module 101 may perform a calculation on the data to be detected based on the preset calculation method to obtain the first calculation result.

The above-mentioned FIG. 6 corresponds to the method provided in the embodiment, and by determining the type of the detected module and using the preset calculation method corresponding to the type to perform calculations, various detected modules can be detected differently, which improves the pertinence and accuracy of data detection.

Exemplary Electronic Device

Hereinafter, an electronic device 700 according to an embodiment of the present disclosure will be described with reference to FIG. 7. The electronic device 700 may comprise a data detection module 701 and a detected module 702, wherein the detected module 702 may be various types of memory.

The electronic device 700 can be various electronic devices, comprising but not limited to embedded chips, embedded-chips-based boards, smart phones, tablet computers, e-book readers, MP3 players (Moving Picture Experts Group Audio Layer III), MP4 (Moving Picture Experts Group Audio Layer IV) players, laptop portable computers and desktop computers, etc.

The data detection module 701 may comprise a central processing unit (CPU) or other forms of processing units with data processing capabilities and/or instruction execution capabilities, and may control other components in the electronic device 700 to perform desired functions.

In an example, the electronic device 700 may further comprise an input device 703 and an output device 704 which are interconnected by a bus system and/or other forms of connection mechanisms (not shown).

For example, the input device 703 may be a device for inputting various types of data, such as a mouse, a keyboard, a touch panel, a microphone, and so on.

The output device 704 can output various information to the outside, comprising information used to represent the fault state of the detected module 702. The output device 704 may comprise, for example, a display, a speaker, a printer, a communication network and a remote output device connected to it, and so on.

Figure 7:
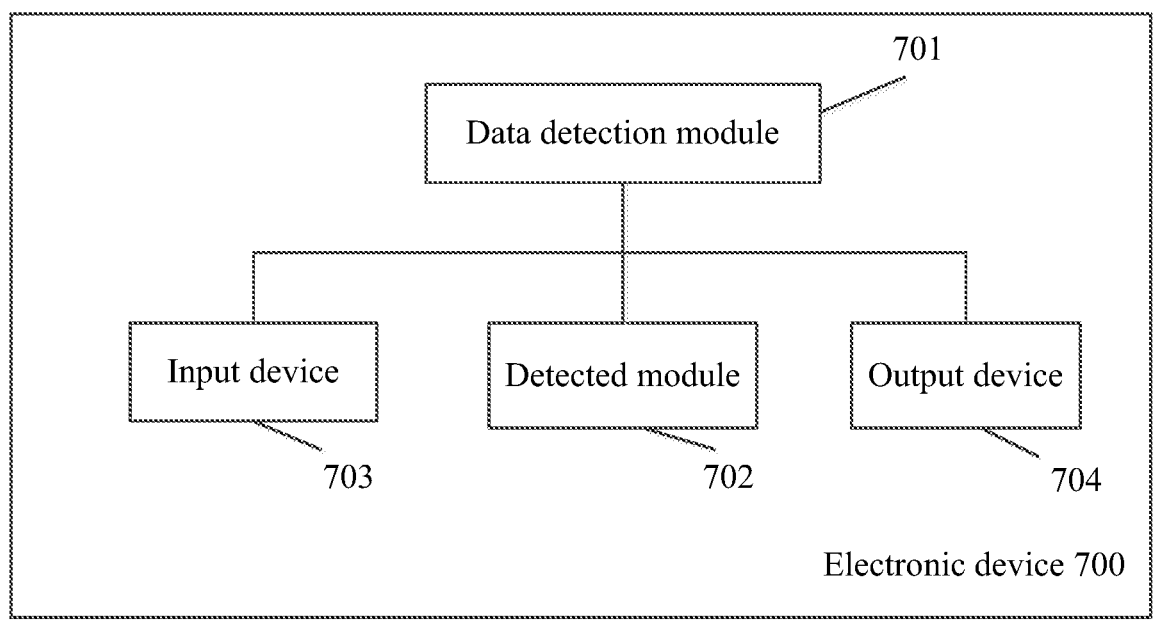
FIG. 7 is a structural diagram of an electronic device provided by an exemplary embodiment of the present disclosure.

Of course, for simplicity, regarding the electronic device 700, in FIG. 7, only some of the components related to the present disclosure are shown, and components such as a bus, an input/output interface, and the like are omitted. In addition, the electronic device 700 may also comprise any other appropriate components according to specific application conditions.

The basic principles of the present disclosure have been described above in conjunction with specific embodiments. However, it should be pointed out that the advantages, merits, effects, etc. mentioned in the present disclosure are only examples but in no way limitations, and these advantages, merits, effects, etc. cannot be considered as necessary for each embodiment of the present disclosure. In addition, the specific details of the disclosure are only serving as exemplary embodiments and ease of understanding, rather than limitations, and the details do not indicate that the present disclosure has to be implemented with these specific details.

The various embodiments in this specification are described in a progressive manner, and each embodiment focuses on the differences from other embodiments, and the same or similar parts between the various embodiments can be understood by referring to each other. As for the system embodiment, since it basically corresponds to the method embodiment, the description thereof is thus relatively simplified, and the relevant part can be understood by referring to the corresponding part of the description of the method embodiment.

The block diagrams of the devices, apparatuses, equipment, and systems involved in the present disclosure are merely illustrative examples and are not intended to require or imply that they must be connected, arranged, and configured in the manner shown in the block diagrams. As those skilled in the art will recognize, these devices, apparatuses, equipment, and systems can be connected, arranged, and configured in any manner. Words such as "comprise", "include", "have", etc. are open vocabulary and mean "comprising but not limited to" and can be used interchangeably. The terms "or" and "and" as used herein refer to the terms "and/or" and can be used interchangeably, unless the context clearly indicates otherwise. The term "such as" used herein refers to the phrase "such as but not limited to" and can be used interchangeably with it.

The method and apparatus of the present disclosure may be implemented in many ways. For example, the method and apparatus of the present disclosure can be implemented by software, hardware, firmware or any combination thereof. The order of the steps for the method is for illustration only, and the steps of the method of the present disclosure are not limited to the order specifically described above, unless specifically stated otherwise. In addition, in some embodiments, the present disclosure can also be implemented as programs recorded in a recording medium, and these programs comprise machine-readable instructions for implementing the method according to the present disclosure. Thus, the present disclosure also covers a recording medium storing a program for executing the method according to the present disclosure.

It should also be pointed out that in the device, equipment and method of the present disclosure, each component or each step can be decomposed and/or recombined and these decomposition and/or recombination should be regarded as equivalent solutions of the present disclosure.

The above description of the disclosed aspects is provided to enable any person skilled in the art to make or use the present disclosure. Various modifications to these aspects are very obvious to those skilled in the art, and the general principles defined herein can be applied to other aspects without departing from the scope of the present disclosure. Therefore, the present disclosure is not intended to be limited to the aspects shown here, but aims at the widest scope consistent with the principles and novel features disclosed herein.

The above description has been given for the purposes of illustration and description. In addition, this description is not intended to limit the embodiments of the present disclosure to the form disclosed herein. Although a number of example aspects and embodiments have been discussed above, those skilled in the art will conceive of certain variations, modifications, changes, additions, and sub-combinations thereof

What is claimed is:

1. A circuit detection method comprising:
    if a preset detection time period starts at a current time point, reading a to-be-detected data corresponding to a detected module from a storage area corresponding to a data storage address of the detected module;
    using a preset calculation method corresponding to the detected module to perform a calculation on the to-be-detected data to obtain a first calculation result; and
    determining a fault state of the detected module based on the first calculation result and a preset calculation result corresponding to the data storage address,
    wherein using the preset calculation method corresponding to the detected module to perform the calculation on the to-be-detected data to obtain the first calculation result, comprises:
        determining a type of the detected module;
        determining the preset calculation method corresponding to the detected module based on the type of the detected module; and
        performing the calculation on the to-be-detected data based on the preset calculation method to obtain the first calculation result.

2. The method of claim 1, wherein the method further comprises:
    determining a magnitude relationship between a current count value used to record the detection time period and a preset count value; and
    if the magnitude relationship indicates that the current count value is the same as the preset count value, determining that the detection time period starts at the current time point.

3. The method of claim 1, wherein reading the to-be-detected data corresponding to the detected module from the storage area corresponding to the storage address of the detected module, comprises:
    determining a data storage address list corresponding to the detected module; and
    sequentially reading the to-be-detected data from the storage area corresponding to each storage address in the storage address list.

4. The method of claim 1, further comprising entering a dormant state in response to completion of detection of the to-be-detected data, and restarting timing of a new detection time period.

5. A data detection circuit, comprising: a data detection module and a detected module, wherein the data detection module is used for:
    if a preset detection time period starts at a current time point, reading a to-be-detected data corresponding to a detected module from a data storage area corresponding to a data storage address of the detected module;
    using a preset calculation method corresponding to the detected module to perform a calculation on the to-be-detected data to obtain a first calculation result; and
    determining a fault state of the detected module based on the first calculation result and a preset calculation result corresponding to the data storage address,
    wherein using the preset calculation method corresponding to the detected module to perform the calculation on the to-be-detected data to obtain the first calculation result, comprises:
        determining a type of the detected module;
        determining the preset calculation method corresponding to the detected module based on the type of the detected module; and
        performing the calculation on the to-be-detected data based on the preset calculation method to obtain the first calculation result.

6. The circuit of claim 5, wherein the data detection module comprises a timer, a calculation unit, and a data positioning unit;
    the timer being used to set and time the detection time period of the data detection module, and when the detection time period starts at the timed time, to outputting a detection signal for instructing the calculation unit to perform data detection;
    the data positioning unit being used to set the data storage address of the to-be-detected data; and
    the calculation unit being configured to
        read the to-be-detected data from the detected module based on the data storage address when the detection signal is detected,
        use the preset calculation method corresponding to the detected module to perform the calculation on the detected module to obtain the first calculation result, and
        determine the fault state of the detected module based on the first calculation result and the preset calculation result corresponding to the data storage address.

7. The circuit of claim 6, wherein the calculation unit comprises a preset calculation result selection subunit, an algorithm subunit, and a calculation result comparator,
    wherein the algorithm subunit is used to obtain the data storage address from the data positioning unit when the detection signal is detected, extract the to-be-detected data from the detected module according to the data storage address, and use the preset calculation method corresponding to the detected module to perform the calculation on the to-be-detected data to obtain the first calculation result;
    the preset calculation result selection subunit is used to select the preset calculation result corresponding to the data storage address; and the calculation result comparator is used to determine the fault state of the detected module based on the first calculation result and the preset calculation result.

8. The circuit of claim 7, wherein the data positioning unit comprises a data storage address list, and the algorithm subunit is used to read the to-be-detected data from the storage area in the detected module corresponding to each storage address in the storage address list, according to the data storage address list.

9. The circuit of claim 7, wherein the algorithm subunit is used to control the calculation unit to enter a dormant state when the detection of the to-be-detected data is completed.

10. The circuit of claim 7, wherein the preset calculation result selection subunit comprises a preset calculation result register group and a selector, wherein the selector selects a corresponding preset calculation result register from the preset calculation result register group according to the data storage address, and extracts the preset calculation result from the selected preset calculation result register.

11. The circuit of claim 6, wherein the timer comprises a counter, a preset count register, and a count comparator, wherein the count comparator is used to compare whether a count value of the counter is the same as a preset value in the preset count register, and if they are the same, it outputs a detection signal to the calculation unit.

12. The circuit of claim 5, wherein the detected module comprises at least one of a register, an internal memory, and an external memory.

13. An electronic device comprising:
a data detection module, a detected module, and a memory for storing executable instructions by the data detection module;
the data detection module being used to read the executable instructions from the memory and execute the instructions to implement a circuit detection method comprising:
if a preset detection time period starts at a current time point, reading a to-be-detected data corresponding to a detected module from a storage area corresponding to a data storage address of the detected module;
using a preset calculation method corresponding to the detected module to perform a calculation on the to-be-detected data to obtain a first calculation result; and
determining a fault state of the detected module based on the first calculation result and a preset calculation result corresponding to the data storage address,
wherein using the preset calculation method corresponding to the detected module to perform the calculation on the to-be-detected data to obtain the first calculation result, comprises:
determining a type of the detected module;
determining the preset calculation method corresponding to the detected module based on the type of the detected module; and
performing the calculation on the to-be-detected data based on the preset calculation method to obtain the first calculation result.

14. The electronic device of claim 13, wherein using the preset calculation method corresponding to the detected module to perform the calculation on the to-be-detected data to obtain the first calculation result, comprises:
determining a type of the detected module;
determining the preset calculation method corresponding to the detected module based on the type of the detected module; and
performing the calculation on the to-be-detected data based on the preset calculation method to obtain the first calculation result.

15. The electronic device of claim 13, wherein the circuit detection method further comprises:
determining a magnitude relationship between a current count value used to record the detection time period and a preset count value;
if the magnitude relationship indicates that the current count value is the same as the preset count value, determining that the detection time period starts at the current time point.

16. The electronic device of claim 13, wherein reading the to-be-detected data corresponding to the detected module from the storage area corresponding to the storage address of the detected module, comprises:
determining a data storage address list corresponding to the detected module;
sequentially reading the to-be-detected data from the storage area corresponding to each storage address in the storage address list.

17. The electronic device of claim 13, wherein the electronic device further comprises an input device and an output device which are interconnected.

* * * * *